3,654,241
FAST CURING ONE-PART SEALANT
John I. Doughty, White Bear Lake, and Philip G. Christman, St. Paul, Minn., assignors to Minnesota Mining and Manufacturing Company, St. Paul, Minn.
No Drawing. Continuation-in-part of application Ser. No. 668,183, Sept. 15, 1967. This application Oct. 30, 1969, Ser. No. 872,746
Int. Cl. C08g 23/00
U.S. Cl. 260—79
15 Claims

ABSTRACT OF THE DISCLOSURE

A one-part, can-stable, mercapto-terminated polymer-based sealant containing ingredients capable of reacting to liberate water in situ thereby enhancing the cure rate of the sealant even at low humidities. The ingredients include (1) a latent oxidative curing agent, (2) a latent, hygroscopic accelerating agent, and (3) a sulfonamido containing compound.

---

This is a continuation-in-part of copending application Ser. No. 668,183, Sept. 15, 1967, now abandoned. This invention relates generally to curable sealant and coating compositions and more specifically to one-part sealant and coating compositions stable under normal storage conditions and curable in the presence of moisture at relatively rapid rates even at low relative humidities.

One-part sealant compositions which incorporate both a room temperature curable base and a curing agent are generally preferred over their two-part counterparts, in which the base and curing agent are separately packaged. This preference is due to several factors, among which are ease of handling, reduction in mixing errors, and elimination of expensive mixing equipment by the user. The one-part moisture-curing sealant compositions available today are based mainly on one of two types of polymers: (1) silicones; and (2) mercapto-terminated polymers, particularly mercapto-terminated polysulfides.

The silicone type sealants are relatively fast curing, and the mercapto-terminated polymers cure somewhat more slowly. In the case of the silicones, water reacts with acetyl groups in the silicone polymer to split off acetic acid and provide cross-linking sites at the location of the departing acetyl groups. This reaction proceeds rapidly throughout the sealant mass, even at low humidities. Silicone based sealants have certain drawbacks, however, viz., high cost, need for special preparation of surfaces to be sealed, difficulties in painting, the tendency of the silicone oil plasticizers to migrate into porous surfaces, poor tear resistance, and the tendency to electrostatically attract dirt.

Mercapto-terminated polymer-based sealants, on the other hand, are relatively inexpensive, easily applied, and present no migration or dirt attraction problems. Their one drawback is a very slow cure rate, especially at low relative humidities. In some areas of the country, this completely eliminates one-part polysulfide sealants from consideration. The disparity in cure rate between mercapto-terminated polymers and silicones appears to be due, at least in part, to the enhanced ability of water to penetrate the matrix of the latter.

The prime objective of this invention is to improve the cure rate of mercapto-terminated polymer based systems.

The foregoing object, as well as others which will become apparent hereinafter, is achieved by a one-part, can-stable composition in the form of a spreadable, viscous, adherent, sag-resistant, thixotropic fluid which comprises broadly a mercapto-terminated liquid polymer, a latent curing agent, a latent, hygroscopic accelerating agent, and an organic compound having an active hydrogen-containing sulfonamido group. The first three components of this composition have been previously combined in sealant compositions (see U.S. Pat. No. 3,225,017). The fourth component converts, by means of internally released water, the known three-component compositions into the first relatively fast, room temperature, low humidity curing sealant of the mercapto-terminated polymer type. Additionally, the cured sealant is highly resistant to the transmission of moisture. Thus compositions of this invention have excellent utility in applications where moisture should be excluded such as sealants for double pane windows where moisture between the panes causes fogging.

The mercapto-terminated liquid polymers are those which undergo further polymerization via the mercapto group according to the following reaction:

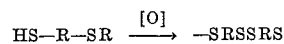

Suitable liquid polymers include mercapto-terminated poly(oxyalkylene) polysulfides (sometimes merely referred to as polyalkylene polysulfides) such as those described in Patrick et al., U.S. Pat. No. 2,466,963 and patents cited therein. These polymers are prepared by splitting a polysulfide having the recurring unit —RSSR— and then reacting the resultant sodium salt of the cleaved polymeric units with hydrogen sulfide to form the terminal mercapto groups. The liquid (at 25° C.) mercapto-terminated poly(oxyalkylene) polysulfides have molecular weights within the range of about 500 to 12,000. Exemplary of these polymers are those sold under the tradenames "LP" and "ZL" polymers such as LP-2, LP-3, ZL541A, and ZL537A.

Other polymers suitable in the practice of this invention are mercapto-terminated polyolefins such as polybutadiene and copolymers of butadiene and poly(oxyalkylene glycols) of the type disclosed in Le Fave et al., in U.S. Pat. No. 3,258,495, having the recurring unit

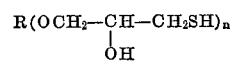

Also suitable are the mercapto-terminated polyesters which can be prepared by esterifying the hydroxyl group of a mercapto alcohol, such as beta-mercaptoethanol, with the carboxyl groups of a polycarboxylic acid, such as a polymerized fatty acid or an acidic polyester of a dicarboxylic acid and a glycol. These polyesters contain only two mercaptan groups. Polyester polymercaptans having an average of slightly more than two mercaptan groups may be similarly prepared by incorporating small proportions of tribasic acids or trihydroxy alcohols. Mixtures of the polyester polymercaptans with the polysulfide polymercaptans above described are also useful in the composition of this invention.

The function of the curing agent in the composition of this invention is to aid or bring about the intermolecular union of the terminal mercapto groups. Suitable curing agents include the peroxides of alkaline earth and alkali metals such as zinc, calcium, strontium, lithium, barium, sodium, and potassium. Seegman et al., U.S. Pat. No.

3,225,017, incorporated herein by reference, discloses these and other suitable curing agents for the composition of this invention.

The ability of a specific curing agent to form an adequately stable mixture with the liquid polymer may be determined by a simple test. To the polymer there is first added one percent by weight of isosebacic acid. The required amount of curing agent is then added and mixed in well. The viscosity of the mixture is noted. The mixture is then placed in a sealed container and held at 120° F. for several days, when it is again examined. With the preferred curing agents the mixture will exhibit no more than a slight thickening after seven days, and in most cases will remain at essentially its initial fluidity for at least three months. Curing agents or oxidizers which cause but slight thickening in three days at 120° F. are useful in many cases, although not preferred where prolonged stability is required. On the other hand, compounds such as lead peroxide are found to cause severe thickening within a few minutes after being added to the polymer, and to cause curing to the rubbery state within a few hours. The rubbery state may be defined as the condition in which the polymer retracts essentially completely when momentarily stretched or compressed.

The third component of the composition of this invention is a latent, hygroscopic accelerating agent. Alkaline materials such as the alkali metal and alkaline earth metal oxides, peroxides and hydroxides are included in this class. Exemplary of such materials are barium, calcium, strontium, lithium, sodium, and potassium oxides, peroxides, and hydroxides; the barium compounds being preferred.

Certain of the above-described materials can perform the dual roles of curing agent and accelerating agent, e.g., the alkali metal and alkaline earth metal peroxides.

The importance of water in curing mercapto-terminated polymers is well known; the reason for it may be explained by reference to the postulated cure mechanism utilizing barium hydroxide and zinc peroxide for illustrative purposes.

(5) $Ba(OH)_2 + HS—R—SH(dry) \rightarrow N.R.$
(6) $Ba(OH)_2 + H_2O \rightarrow Ba^{++} + 2OH^- + H_2A$
(7) $2HSRSH + Ba^{++} + 2OH^- \rightarrow HSRSBaSRSH + 2H_2O$
(8) $ZnO_2 + HSRSBaSRSH \rightarrow BaO + HSRSSRSH + ZnO$
(9) $BaO + H_2O \rightarrow Ba(OH)_2$ Thus, the presence of water is necessary to the formation of ionic barium (step 6) which in turn reacts with the mercaptoterminated polymer (step 7) to initiate the curing process.

The sulfonamido (—$SO_2NH$—) containing compound reacts via an active hydrogen with a metal hydroxide accelerating agent to yield a metal salt of a sulfonamide and water. The metal hydroxide may have been directly incorporated in the sealant composition or formed in situ as the reaction product of an alkali metal or alkaline earth metal oxide or peroxide and water. The formation of the water can best be visualized by reference to the following postulated reactions:

(1) $MO + H_2O \longrightarrow M(OH)_2$ 

(2) $M(OH)_2 + 2RSO_2NHR' \longrightarrow RSO_2\overset{R'}{\underset{|}{N}}—M—\overset{R'}{\underset{|}{N}}SO_2R + 2H_2O$ 

(3) $Q_2O + H_2O \longrightarrow 2QOH$ 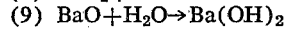

and (4) $QOH + RSO_2NHR' \longrightarrow RSO_2\overset{R'}{\underset{|}{N}}Q + H_2O$ Where Q and M are monovalent alkali metals or divalent alkaline earth metals, respectively, $RSO_2NHR'$ is a compound having an active hydrogen-containing sulfonamido group, and R and R' are hydrogen or monovalent organic radicals. Reactions (2) and (4) require an ionic medium which is achieved by the presence of trace amounts of free water generally acquired from moisture in the atmosphere. In the presence of such moisture, reactions (2) and (4) proceed almost instantaneously. The water shown in reactions (1) and (3) is likewise generally acquired from the atmosphere, the acquisition being aided by the hygroscopic nature of MO and $Q_2O$, latent hygroscopic accelerating agents. It should be emphasized that instead of employing the oxides MO or $Q_2O$, the corresponding peroxides may also be employed. Such peroxides will react with water to form the corresponding hydroxide, and like the oxides, will ultimately liberate twice the amount of water absorbed in reacting with the sulfonamido containing compounds of this invention. It is also possible to employ the corresponding hydroxides directly. Since free water must be present for reactions (2) and (4) to occur, systems containing the hydroxides in combination with the other ingredients of this composition will remain stable so long as free water is not present. The difficulty of maintaining such anhydrous conditions makes it preferable that at least a portion of the latent, hygroscopic accelerating agent consist of alkali metal or alkaline earth metal oxides or peroxides. As will be demonstrated hereinafter, the compositions of this invention will cure through at an extremely rapid rate if even a drop of water is placed in contact with the composition. Apparently this free water is initiating reactions (2) and (4) which liberate two equivalents of water for each equivalent absorbed. This in situ water can trigger subsequent reactions deeper in the sealant body and this chain reaction serves to make water available throughout. This in situ generated water is especially effective in enhancing the cure rate since it avoids any moisture barrier due to skinning of the sealant surface.

Since it is an active hydrogen in the sulfonamido radical which reacts with the metal hydroxide accelerating agent, the remainder of the molecule to which the —$SO_2NH$— radical is attached is relatively non-critical so long as the compound as a whole is or can be made compatible with the sealant system and an N-substituted hydrogen is reactive with the metal hydroxide accelerating agent to release water. However, certain sulfonamido containing compounds have been found to exhibit marked superiority in the composition of this invention and are therefore preferred. Thus, the sulfonamido containing compound may be defined by the structural formula $RSO_2NHR'$ where R is a monovalent substituent, exemplary of which are hydrogen, an organo radical, a primary, secondary, or a tertiary amino group. R' is also a monovalent radical, generally hydrogen or an organo radical, preferably of less than 7 carbon atoms. The term "organo radical" as used herein is intended to mean radicals having at least one carbon atom as well as hydrogen and/or non-hydrogen atoms.

The monovalent organo radicals may be aliphatic, alicyclic, or aromatic, exemplary of which are methyl, ethyl, isopropyl, pentyl, neo-pentyl, hexyl, cyclohexyl, phenyl, and tolyl. Preefrably R is an aromatic radical such as phenyl or tolyl and R' is hydrogen or an aliphatic radical having from about 1 to about 6 carbon atoms. Compounds fitting this description include benzenesulfonamide, N-ethyl-benzene-sulfonamide (sold under the trade name Santicizer 3), N-ethyl-p-toluenesulfonamide (sold under the trade name Santicizer 3), N-ethyl-o-toluenesulfonamide, and N-cyclohexyl-p-toluenesulfonamide (sold under the trade name Santicizer 1–H), and mixtures thereof such as a mixture of N-ethyl-o- and N-ethyl-p-toluenesulfonamides (sold under the trade name Santicizer 8); and a mixture of o- and p-toluenesulfonamide (sold under the trade name Santicizer 9). The preferred system is a 1:1 by weight mixture of N-ethyl-benzenesulfonamide and N-ethyl-paratoluenesulfonamide in the form of a eutectic mixture prepared by melting the two together at 160° F.

The relative quantities of mercapto-terminated liquid polymer, curing agent, latent hygroscopic accelerating agent, and sulfonamido containing compound may vary over broad ranges. The curing agent should of course be present in an amount sufficient to completely cure the mercapto-terminated polymer. Preferably, at least a stoichiometric quantity of curing agent is employed. The latent, hygroscopic accelerating agent, should be adapted and sufficient to maintain the contents of the package in dry condition during shipment and storage. The number of chemical equivalent weights of the sulfonamides useful in this invention may vary from 0.025 to several times the number of chemical equivalent weights of the accelerating agent. A ratio of 0.025 to 21 times the number of chemical equivalent weights of the accelerating agent is preferred, with about 0.4 to 1 times the number of chemical equivalent weights of accelerating agent being most preferred. Generally, these requirements are met by a composition in which for each chemical equivalent weight of mercapto-terminated polymer, there are from about 1.0 to about 28.0 (preferably about 4.0 to about 7.0) chemical equivalent weights of the curing agent and from about 0.5 to 13.0 (preferably from about 2.0 to 3.5) chemical equivalent weights of the accelerating agent and from about 0.3 to about 11.0 (preferably about 1.5 to 2.0) chemical equivalent weights of the sulfonamide. The primary limitation on the maximum quantity of curing agent and latent accelerating agent is the loss of spreadable consistency and can stability. The primary limitation on the minimum quantity of accelerating agent is an acceptable rate of cure. The primary limitation on the minimum quantity of curing agent is the degree of ultimate cure required. Most preferred is a composition in which 4 chemical equivalent weights of curing agent and 2.5 chemical equivalent weights of the accelerating agent, and 2 chemical equivalent weights of sulfonamide are combined with one chemical equivalent weight of mercapto-terminated polymer. Preferably, at the time of packaging less than about 70% by weight of the latent, hygroscopic accelerating agent consists of alkali metal or alkaline earth metal hydroxides. This percentage may increase to as much as 100% prior to application of the sealant due to the non-hydroxide accelerating agent's reacting with moisture, which is generally unavoidably present in the package, to form the corresponding hydroxide. Formation of hydroxides in this manner inherently provides the drying action necessary to maintain can stability. By taking precautions to employ anhydrous materials in formulating the packaged composition, hydroxide accelerating agents may be used exclusively.

The following examples serve to further illustrate the invention without limiting it in any way.

EXAMPLE I

A master batch having the following composition is prepared in a five gallon Baker-Perkins mixer:

Master batch

Name: Weight (grams)
(1) "Thiokol" ZL 541A [a] _____ 8750
(2) "Thiokol" ZL 537A [b] _____ 1250
(3) RR 10 [c] _____ 100
(4) Bal mill pre-mix _____ 4972
(5) Filler _____ 5500
(6) Polyester resin [d] _____ 535

21107

Ball mill pre-mix (7) Barium hydroxide (anhydrous) _____ 600
(8) Barium oxide _____ 540
(9) Calcium peroxide _____ 1200
(10) HB-40 [e] _____ 1200
(11) Toluene _____ 600
(12) "Igepal" CO 210 [f] _____ 27
(13) "Santowax" R [g] _____ 1800

5967

See footnotes at end of table.

Filler

(14) "Purecal" U [h] _____ 4900
(15) "Tipure" R-610 [i] _____ 2800

7700

[a] Trade name for a non-crosslinked mercapto-terminated polysulfide having a molecular weight of about 4000 and a viscosity of between 350–450 poises at 25° C. as measured on a Brookfield Viscometer.
[b] Same as (a) except 4 mol percent cross-linking sites.
[c] Trade name for mixed isomers of dixylyl disulfides which function as chain stoppers.
[d] A carboxyl-terminated polyester having a hydroxyl number of 3 or less, an acid number of about 42, and a viscosity of about 800 poises at 25° C.
[e] Trade name for a hydrogenated terphenyl plasticizer.
[f] Trade name for a nonyl phenol-ethylene oxide adduct which functions as a nonionic oil soluble surfactant.
[g] Trade name for a solid plasticizer composed of a mixture of o, m and p-terphenyl.
[h] Trade name for an untrafine precipitated calcium carbonate.
[i] Trade name for titanium dioxide (rutile).

MAKE PROCEDURE

Ball mill pre-mix preparation.— 1 gal. ball mill jar containing a sufficient number of pebbles is charged with the above ball mill ingredients, except the "Santowax" R and rolled overnight at about 24 r.p.m. The "Santowax" R is then added and milling continued for 5 days at which tibe adequate dispersion is achieved.

Filler preparation.—A 5 gal. blender is charged with the two filler ingredients which are blended overnight using steam at 15 p.s.i.g. for drying. The contents are then transferred to a pail equipped with a drying tube for storage prior to use.

Master batch preparation.—To a 5 gal. covered Baker-Perkins mixer equipped with a nitrogen sweep is added with mixing and under a nitrogen atmosphere the ingredients listed under the heading "Master Batch" in the order stated. Addition and mixing is complete after six hours.

Individual batches containing 844 g. of the master batch and one of the ingredients listed below are prepared in a quart size mixer in a dry box.

| Sample | Ingredient | Amount (grams) |
|---|---|---|
| 1a | N-ethylbenzenesulfonamide/N-ethyl-para-toluene-sulfonamide. | 17.6 |
| 1b | do | 35.2 |
| 1c | do | 70.5 |
| 1d | do | 141.0 |
| Control | (Nothing added) | |

Can lids approximately 2 inches in diameter and ¼ inch deep are filled with each of the above samples and exposed under the conditions stated in Table I.

TABLE I

| Sample | Cure through, 75° F., 50% RH | Days to reach ¼" depth 80° F., 80% RH |
|---|---|---|
| 1a | 40 | 19 |
| 1b | 20 | 12 |
| 1c | 3 | 1 |
| 1d | 2 | 1 |
| Control | (¹) | 29 |

¹ The control did not cure through at 60 days.

EXAMPLE II

The rapid cure rate of the composition of this invention is particularly dramatic when a very small amount of water is applied to the surface of the composition whereas equal amounts of water appear to have no effect on the cure rate of similar compositions without a sulfonamide.

This phenomena is demonstrated by the following composition:

Ball mill

| Ingredient: | Weight (grams) |
| --- | --- |
| Ba(OH)$_2$ | 100 |
| BaO | 90 |
| CaO$_2$ | 200 |
| "HB-40" | 400 |
| Toluene | 100 |
| "Igepal" CO 210 | 4.5 |
| | 894.5 |

Master batch

| Ingredient: | Weight (grams) |
| --- | --- |
| ZL 541A | 1500 |
| LP$_2$ ʲ | 500 |
| Carbon black | 70 |
| "Purecal" U | 700 |
| "Lesamite" ᵏ | 1230 |
| RR 10 | 20 |
| Polyester resin | 61 |
| Ball mill | 894.5 |
| | 4975.5 |

ʲ Trade name for a liquid mercapto terminated polyalkylene polysulfide.
ᵏ Trade name for ground calcite of about 15 microns.

Both the Master Batch and the Ball Mill are prepared as in Example I. To a 6000 gram aliquot of the master batch is added with mixing 480 grams of N-ethylbenzenesulfonamide. A can lid of the dimensions used in Example I is filled with a sample of this material and tested for rate of cure. A control of the batch material without sulfonamide is similarly prepared and tested. The results are given in Table II.

TABLE II

| | Cure overnight at 25% RH, 73° F. | |
| --- | --- | --- |
| | Without drop of water | One drop of water |
| Test material | Surface cured | Cured through. |
| Control | No change | No change. |

EXAMPLE III

To 6000 g. aliquots of the master batch prepared in Example II is added 480 g. of the sulfonamides shown in Table III and samples of each used to fill can lids as previously described. The samples are then exposed to the conditions shown in Table III, together with a control containing no sulfonamide.

TABLE III

| | Depth of cure | |
| --- | --- | --- |
| Ingredient | 5 days, 75° F. 50% RH | 5 days, 80° F. 80% RH |
| N-ethyl-paratoluene sulfonamide. | Complete (0.25 inch). | Complete. |
| N-cyclohexyl-p-toluene sulfonamide. | .07 inch | Do. |
| Mixture of o- and p-toluene sulfonamide. | Nearly complete | Nearly complete. |
| N,N-dimethylbenzene-sulfonamide. | .03 inch | .07 inch. |
| Control | .01 inch | .09 inch. |

The criticality of employing a compound having an active hydrogen containing sulfonamido group is demonstrated by the lack of improvement of the non-active hydrogen containing N,N-dimethylbenzenesulfonamide sample over the control.

Sealants embodying the composition of this invention also contain various additives which serve to tailor the sealant to the particular end use as can be seen from the compositions described in the foregoing examples. The addition of and increase in the amount of fillers, pigments and reinforcing agents such as calcium carbonate, iron oxide, aluminum powder, silicon dioxide, clays, zinc sulfide, carbon black, rayon floc, titanium dioxide, etc., will in general increase the Shore hardness, toughness and tensile strength and decrease elongation of the product.

Certain resinous additives may be employed to reduce sag and promote adhesion of the sealant to the substrate. The carboxyl terminated polyester employed in Example I having a viscosity of about 800 poises at 25° C. exemplifies a suitable sag inhibitor. Plasticizers, which increase the fluidity of the composition, improve the dispersion of the solids and soften the cured composition, represent a further class of additives. Hydrogenated terphenyl available under the trade-name HB–40 is a suitable plasticizer as are the chlorinated diphenyl compositions avaiable under the trade name Aroclor.

The compositions of this invention exhibit satisfactory shelf-stability under normal storage conditions. Packaged in fluid form, the compositions can be extruded by means of a calking gun in thin ribbon form with sufficient body to adhere to vertical surfaces without appreciable sagging. While the compositions of this invention cure at a faster rate than was hitherto obtainable with one-part mercapto-terminated polymer based sealants, the work life of the composition is still completely satisfactory. Particular applications for the compositions of this invention include sealants and coatings for buildings, automobiles, boats and airplanes.

We claim:
1. A spreadable, viscous, fluid composition stable in a substantially moisture free, hermetically sealed container and capable of conversion to a rubbery state in the presence of surroundings containing essentially only moisture, said composition comprising a liquid mercapto-terminated polymer capable of oxidative curing via said terminal mercapto-groups having thoroughly dispersed therein:
   (a) at least one latent oxidative curing agent in an amount sufficient to cure said polymer, said curing agent in admixture with said polymer causing not more than slight thickening thereof in three days at 120° F.;
   (b) at least one latent hygroscopic accelerating agent selected from the group consisting of the alkali metal and alkaline earth metal oxides, peroxides, and hydroxides, said accelerating agent being adapted and sufficient to maintain said composition in dry condition during shipment and storage and to attract and absorb moisture from its surroundings after deposition in place to hasten the curing of said polymer; and
   (c) at least one organic compound having at least one active hydrogen containing sulfonamido group, said compound being capable of reacting in situ with an alkali metal hydroxide or alkaline earth metal hydroxide from part (b) to form the corresponding metal salt of said compound and water.

2. The composition of claim 1 wherein said curing agent is at least one member selected from the class consisting of an alkali metal peroxide and alkaline earth metal peroxides.

3. The composition of claim 1 wherein said mercapto terminated polymer is a polysulfide polymercaptan.

4. The composition of claim 1 wherein said compound having at least one active hydrogen containing sulfonamido group is represented by the formula RSO$_2$NHR' where R is an aryl radical and R' is selected from the class consisting of hydrogen and an aliphatic radical.

5. A spreadable, viscous, fluid composition stable in a substantially moisture free hermetically sealed container and capable of conversion to a rubbery state in the presence of surroundings containing essentially only moisture, said composition comprising a liquid mercapto-terminated polymer capable of oxidative curing via said terminal mercapto groups having thoroughly dispersed therein:
   (a) at least one latent, oxidative curing agent in an amount sufficient to cure said polymer, said curing agent in admixture with said polymer causing not more than slgiht thickening thereof in three days at 120° F.;

(b) at least one latent hygroscopic accelerating agent selected from the class consisting of the alkali metal and alkaline earth metal oxides, peroxides, and hydroxides, said accelerating agent being adapted and sufficient to maintain said polymer in dry condition during shipment and storage and to attract and absorb moisture from its surroundings after deposition in place to hasten the curing of said polymer; and (c) at least one compound represented by the formula RSO$_2$NHR' where R and R' are monovalent radicals selected from the class consisting of hydrogen, an aliphatic group, an alicyclic group, and an aromatic group, said compound being compatible in said composition.

6. A spreadable, viscous, fluid composition stable in a substantially moisture free hermetically sealed container and capable of conversion to a rubbery state in the presence of surroundings containing essentially only moisture, said composition comprising a liquid mercapto-terminated poly(oxyalkylene) polysulfide having thoroughly dispersed therein:

(a) calcium peroxide in an amount sufficient to cure said polymer;

(b) a mixture of barium oxide and barium hydroxide adapted and sufficient to maintain said composition in dry condition during shipment and storage and to attract and absorb moisture from its surroundings after deposition in place to hasten the curing of said polymer; and (c) a mixture of N-ethylbenzenesulfonamide and N-ethyl-para-toluenesulfonamide.

7. A spreadable, viscous, fluid composition stable in a substantially moisture free hermetically sealed container and capable of conversion to a rubbery state in the presence of surroundings containing essentially only moisture, said composition comprising a liquid polymer selected from the class consisting of a polyester polymercaptan and a polysulfide polymercaptan, having thoroughly dispersed therein:

(a) at least one latent oxidative curing agent in an amount sufficient to cure said polymer, said curing agent in admixture with said polymer causing not more than slight thickening thereof in three days at 120° F.;

(b) at least one latent hygroscopic accelerating agent selected from the group consisting of the alkali metal and alkaline earth metal oxides, peroxides, and hydroxides, said accelerating agent being adapted and sufficient to maintain said composition in dry condition during shipment and storage and to attract and absorb moisture from its surroundings after deposition in place to hasten the curing of said polymer; and (c) at least one compound having the formula

RSO$_2$NHR' wherein R and R' are selected from the class consisting of hydrogen, an aliphatic group, an alicyclic group, and an aromatic group.

8. The composition of claim 7 wherein said liquid polymer is a mercapto-terminated poly(oxyalkylene) polysulfide.

9. The composition of claim 7 wherein at least a portion of said accelerating agent is barium oxide.

10. The composition of claim 7 wherein said curing agent is calcium peroxide.

11. The composition of claim 7 wherein a single compound combines the functions of a latent, oxidative curing agent and a latent hygroscopic accelerating agent, said compound being selected from the class consisting of the alkali metal and alkaline earth metal peroxides.

12. The composition of claim 7 wherein R is an aryl radical and R' is an aliphatic radical.

13. The composition of claim 7 wherein R is phenyl.

14. The composition of claim 7 wherein (c) is at least one member of the class consisting of N-ethylbenzenesulfonamide and N-ethyl-para-toluenesulfonamide.

15. The composition of claim 7 wherein R' is an aliphatic radical having from 1 to about 6 carbon atoms.

References Cited
UNITED STATES PATENTS 3,225,017   12/1965   Seegman et al. _____ 260—79.1

M. J. WELSH, Primary Examiner

M. I. MARQUIS, Assistant Examiner

U.S. Cl. X.R.

117—161 R; 260—30.4 R, 33.6 R, 33.8 R, 37 R, 79.1, 79.5 C, 823, 860

UNITED STATES PATENT OFFICE
CERTIFICATE OF CORRECTION

Patent No. 3,654,241    Dated April 4, 1972

Inventor(s) John I. Doughty and Philip G. Christman

It is certified that error appears in the above-identified patent and that said Letters Patent are hereby corrected as shown below:

Column 2, line 24, the formula
"HS-R-SR $\overset{[O]}{\phantom{x}}$ -SRSSRS"
should read as follows:
--HS-R-SH $\overset{[O]}{\phantom{x}}$ -SRSSRS- --.

Column 3, line 42, the formula
"$Ba(OH)_2 + H_2O \quad Ba^{++} + 2OH^- + H_2A$" should be changed to read --$Ba(OH)_2 + H_2O \quad Ba^{++} + 2OH^- + H_2O$--.

Column 5, line 60, the word "Bal" should be changed to read --Ball--.

Signed and sealed this 22nd day of May 1973.

(SEAL)
Attest:

EDWARD M. FLETCHER, JR.
Attesting Officer

ROBERT GOTTSCHALK
Commissioner of Patents